N. FRANZEN.
WIRE GLASS MACHINE.
APPLICATION FILED JULY 6, 1903.
936,880.
Patented Oct. 12, 1909.
3 SHEETS—SHEET 1.
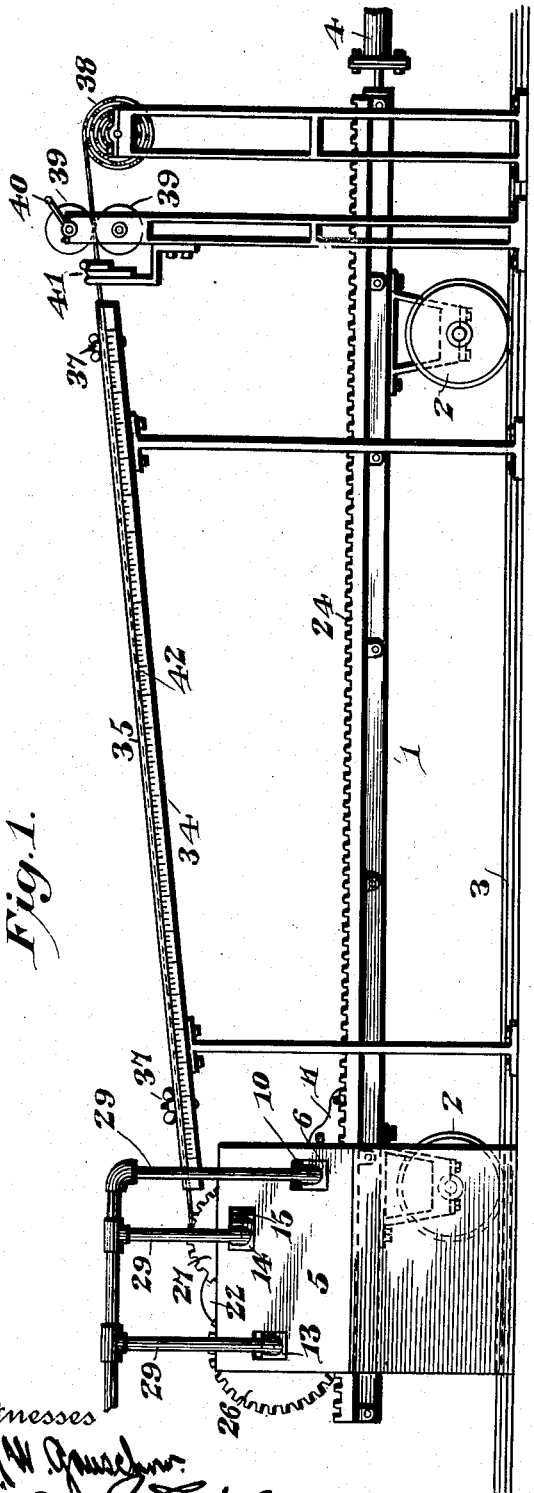
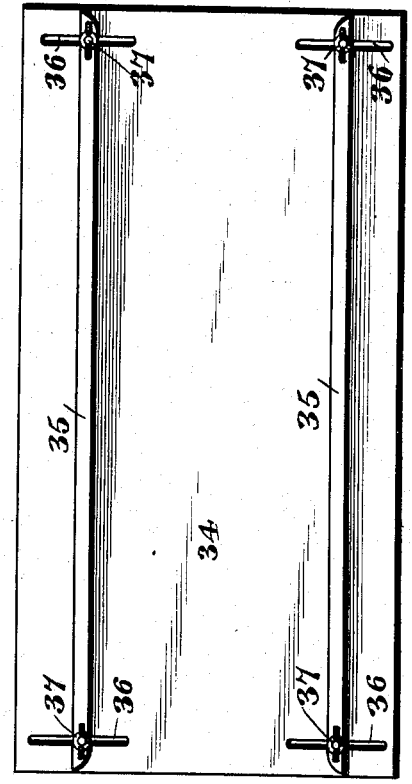
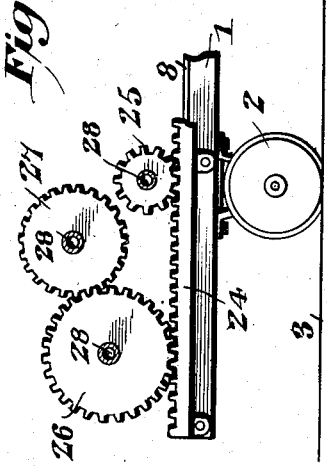
Witnesses
Inventor
Nicklas Franzen
by Christy and Christy
his attorneys

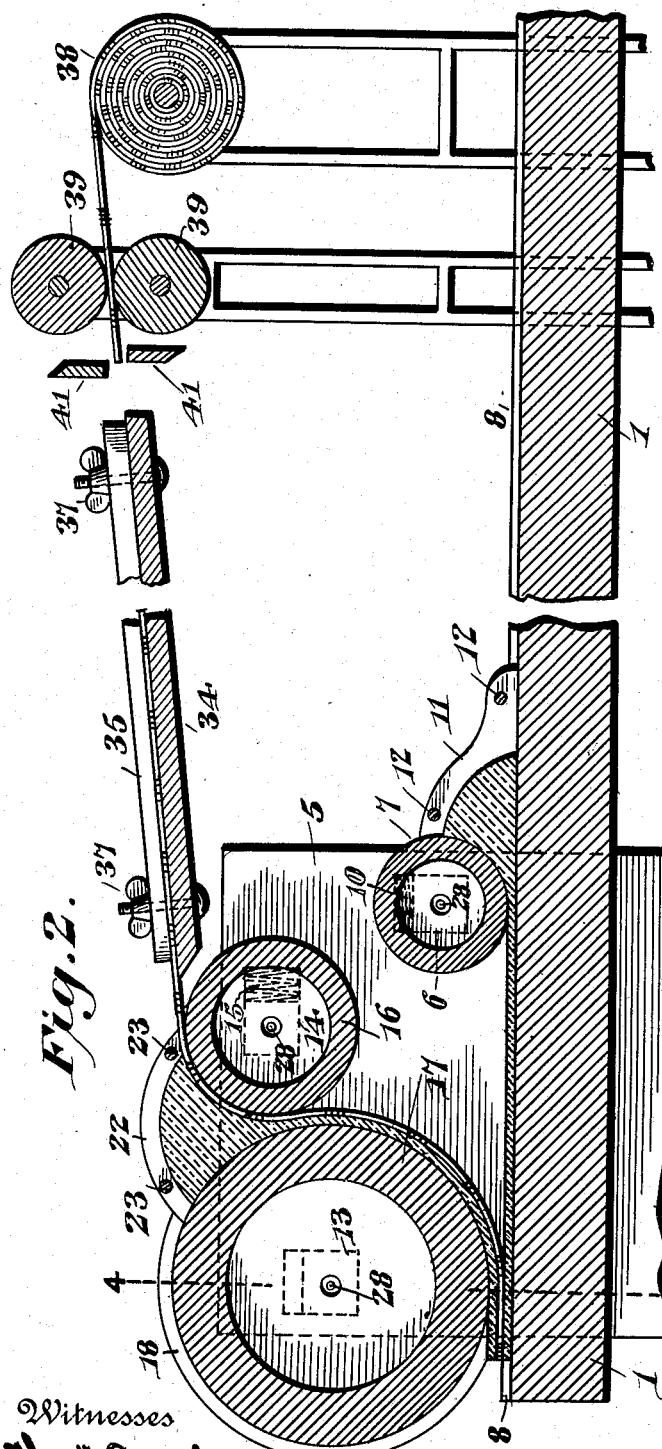
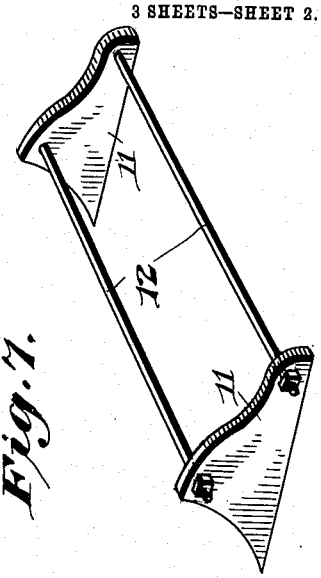
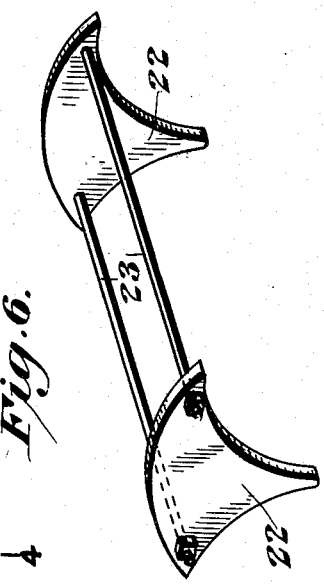

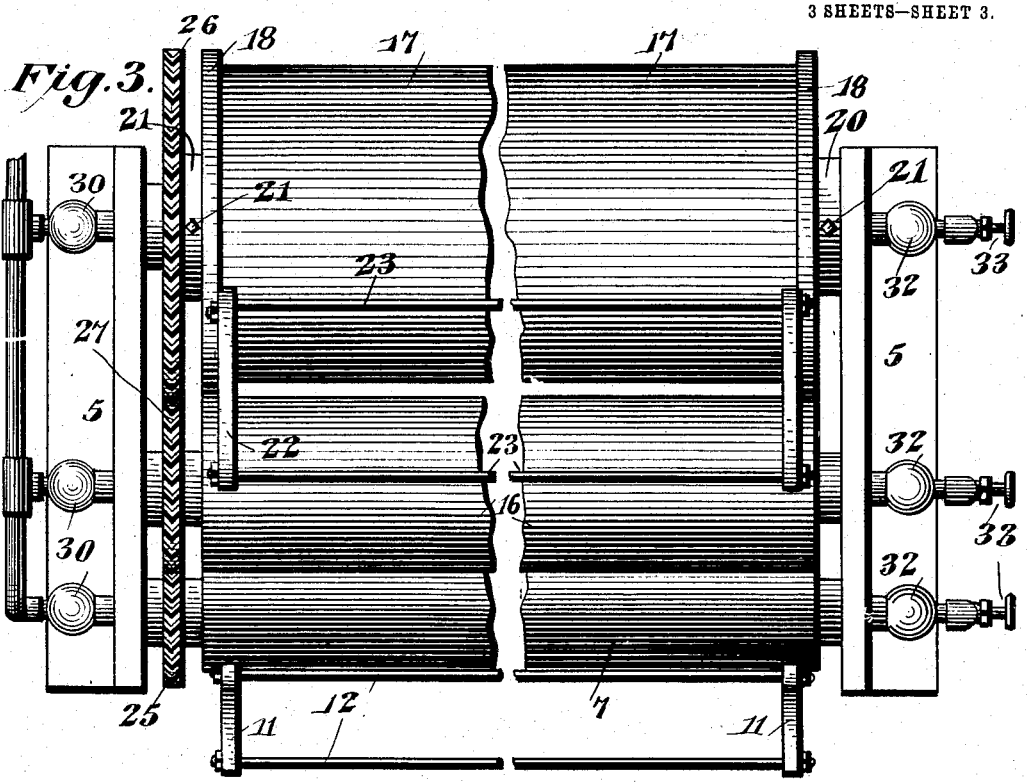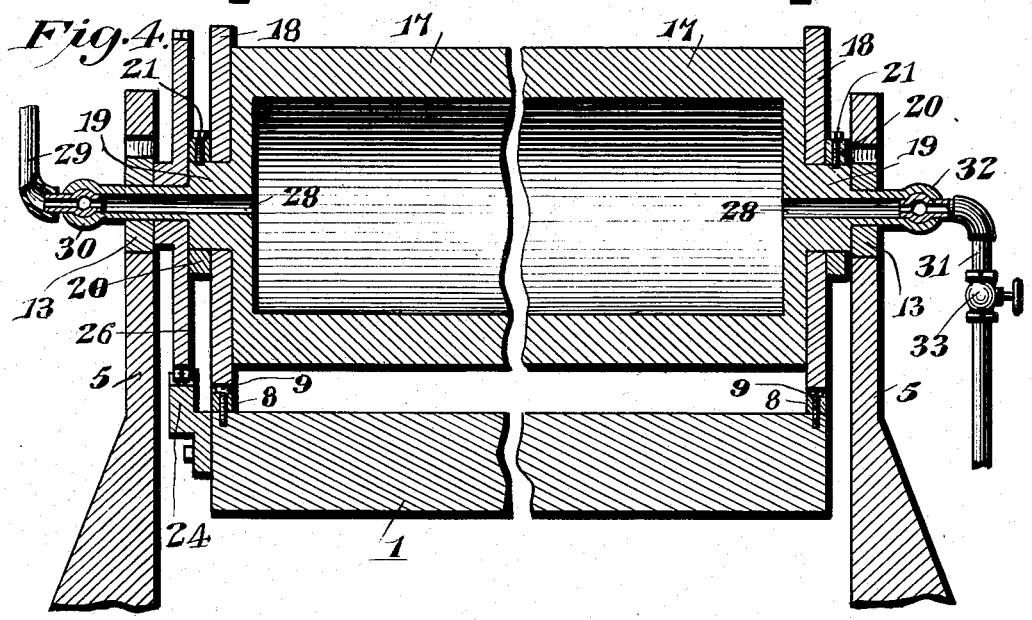

UNITED STATES PATENT OFFICE.

NICKLAS FRANZEN, OF SAGINAW, MICHIGAN, ASSIGNOR TO MISSISSIPPI GLASS COMPANY, A CORPORATION OF MISSOURI.

WIRE-GLASS MACHINE.

936,880.   Specification of Letters Patent.   Patented Oct. 12, 1909.

Application filed July 6, 1903. Serial No. 164,495.

*To all whom it may concern:*

Be it known that I, NICKLAS FRANZEN, a citizen of the United States, residing at Saginaw, county of Saginaw, and State of Michigan, have invented certain new and useful Improvements in Wire-Glass Machines, of which the following is a specification.

This invention relates to means for manufacturing that class of glass having wire embedded therein and commercially known as wire glass.

The primary object of this invention is to provide mechanism for carrying into effect the novel method described and claimed in a patent granted to me on October 13, 1903, No. 741125. The advantages of the method are fully set forth in said application and it is believed to be unnecessary to restate them in this case. There are other features, however, to which it is desired to call especial attention. In the first place it has heretofore been the usual custom to cool the rollers of sheet-forming mechanisms by water introduced therein. This supply of water has heretofore, so far as I am aware, been controlled at the inlet end and in order to properly cool said rollers, the supply must be sufficient to keep the rollers filled. In other words, a comparatively great head of water must be permitted to pass through the rollers.

One of the features of the present invention is to provide means for controlling the passage of water through the rollers at the discharge ends so that said rollers may be always kept filled without regard to the amount of discharge and thus kept at any desired temperature.

Difficulty has also been experienced in forming sheets of different thicknesses in the same machine. I employ a combination of elements which will permit ready change of relation of the sheet-forming mechanism so that any desired thickness of sheet may be obtained and the wire can be incorporated at any depth desired.

In one method employed in the manufacture of wire glass heretofore, the sheets of netting have been cut, rolled upon a table to flatten the twists and force them so close together that there are no air interstices. After this operation, the cut sheets are piled and carried to the sheet-forming mechanism. If dirt, grease or perspiration comes into contact with the wire, stains, bubbles and defects are formed in the finished sheets. Moreover, constant handling loosens the twists in the wire so that air spaces again become formed and the first rolling is made of no effect.

One of the objects of the present invention is to provide means by which the wire may be rolled, cut and fed to the machine without the handling above noted and with a correspondingly great increase in perfect finished sheets.

The means which at present is considered preferable for carrying into effect the method covered by the said copending application and for accomplishing the objects noted above is illustrated in the accompanying drawings, wherein:—

Figure 1 is a side elevation of the new machine; Fig. 2 is a vertical longitudinal sectional view through the same on an enlarged scale, intermediate and unnecessary portions being broken away; Fig. 3 is a top plan view of the rolling mechanism; Fig. 4 is a transverse sectional view on the line 4—4 of Fig. 2; Fig. 5 is a detail view in elevation showing the gearing employed for driving the rollers; Fig. 6 is a detail perspective view of the gun employed in forming one of the sheets; Fig. 7 is a similar view of the other gun employed; and Fig. 8 is a top plan view of the chute.

Similar reference numerals designate similar parts throughout the specification and drawings.

In the embodiment illustrated, a reciprocatory casting table 1 is employed, carried by wheels 2 that run upon tracks 3 and operated by any means desired, as for instance, a hydraulic motor 4. Arranged on opposite sides of the table are standards 5, in which are located vertical sliding boxings 6. Co-acting with the table is a primary layer-forming roller 7 located above said table a distance equal to the thickness of the first layer of glass. This distance is obtained by "trangs" or tracks 8 detachably secured to the opposite edges of the table by screws 9 having their heads countersunk in the tracks as illustrated in Fig. 4, the roller resting upon said tracks. The said roller, if not heavy enough to retain its position upon the tracks, may be urged downwardly by springs 10 bearing upon the boxings 6. Located in advance of this primary layer-forming roller is the usual gun consisting of spaced plates 11 arranged to rest upon the table and bear against the roller, and adjustable toward and from each other, being connected by bolts 12.

The standards are provided in rear of the boxings 6, and above the same, with vertically and horizontally moving boxes 13 and 14, the latter being urged rearwardly or toward the boxes 13 by springs 15. These boxings carry coacting rollers 16 and 17 which may be termed the secondary layer-forming means or rollers. These coacting rollers 16 and 17 are spaced apart a distance equal to the thickness of the second layer, while the roller 17 also coacts with the table 1 and is spaced therefrom a distance equal to the thickness of the finished sheet. The spacing of the roller 17 from the table and from the roller 16 is accomplished by cap disks or plates 18 fitted upon projecting gudgeons 19 of said roller and extending beyond the peripheral face of the same a distance equal to the thickness of the secondary layer, thus forming projecting flanges which run upon the "trangs" or tracks 8, and also bear against the peripheral face of the roller 15. These cap plates are held in place by means of collars 20 located on the gudgeons outside of said plates and secured by suitable set screws 21. It will thus be seen that the cap plates are removable and can be replaced by those of larger or less diameter for varying the thickness of the secondary layer and the finished sheet. Coacting with and supported by the rollers 16 and 17 is another gun comprising wedge-shaped end plates 22 arranged to fit between said rollers, being adjustable toward and from each other and connected by tie bolts 23. For the purpose of actuating the rollers simultaneously with the movement of the casting table, a rack 24 is suitably attached to one side of said table, and a gear wheel 25 fastened to the primary layer-forming roller 7 has teeth meshing with this rack. Another gear wheel 26, carried by the large roller 13 also meshes with the rack and moreover drives a gear wheel 27 carried by the roller 16. It is believed to be desirable to provide the racks and rollers with intermeshing oblique teeth as shown in Fig. 3, but this is not absolutely necessary to the operation of the machine.

The various rollers are hollow as illustrated in Fig. 4 and the gudgeons and journals are provided with inlet and outlet passageways 28. Water or other cooling liquid is introduced through one of the passageways of each roller by a pipe 29 which may be flexible to permit the movement of the boxings, a revoluble coupling 30 being interposed between the inlet pipe and the passageway. An outlet conduit 31 leads from the opposite passageway and has a suitable revoluble coupling 32 therewith. In this outlet pipe is located a suitable valve 33, by means of which the volume of water or liquid passing through the roller is controlled.

For the purpose of directing the wire netting between the coacting rollers 16 and 17, an inclined platform or chute 34 is employed suitably supported above the casting table and having its lower end disposed over the roller 16. The distance between the chute and the table just in advance of the roller 7 is sufficient to permit the teeming of "metal" without difficulty or material interference. Upon this chute are arranged longitudinally disposed guide bars 35, which are adjustable toward and from each other. To this end transverse slots 36 are formed in the corners of the chute and clamp bolts 37 passing through the ends of the guides also pass through the slots, said bolts serving to hold the guides in any relation desired. A wire reel 38 is supported a short distance from the upper end of the chute, this reel being freely revoluble. Between the reel 38 and said chute are located coacting feed and flattening rollers 39 which may be operated by any suitable means, as for instance, a hand crank 40. The rollers are spaced a slight distance from the chute and in this space is located cutting means which may be in the form of ordinary shears 41 disposed transversely of the chute. A scale 42 is located along one edge of the chute and is so arranged that it starts from the shears.

The operation of the mechanism is as follows:—A roll of wire netting having been placed upon the reel, the free end of said netting is passed between the coacting rollers 39. The wire netting may thus be advanced along the chute by means of the rollers and any length desired can be measured by the scale. The rollers constitute feeding means which will do away with the necessity of manually handling the wire and also serve to flatten the twists besides eliminating the air interstices formed in the same. The desired length having been obtained, the netting is cut by the shears and the advance end is placed between the coacting rollers 16 and 17. The mechanism is thereupon ready for the sheet-forming operation. "Metal" is simultaneously teemed between the coacting rollers 16 and 17 and also upon the table in advance of the roller 7. Simultaneously with this teeming, motion is imparted to the table and consequently to the various rollers.

Immediately therefore, two separate layers of glass are being formed at independent points and in the under face of the upper or secondary layer is incorporated the wire netting. This layer will be carried downwardly by the roller 17 and will contact with the primary layer upon the table beneath said roller, which will unite them as clearly shown in Fig. 2, the finished product being located on the table in rear of the rollers. The advantages derived from this manner of manufacturing the layers and uniting them is fully pointed out in my patent to which reference has before been made so that it is believed to be unnecessary to again describe them now. The arrangement and construction of many of the features is also advantageous. For instance, sheets of any desired width and of great length may be manufactured, the guns being adjustable and the guides for the netting being also adjustable to properly coact with said guns. It will also be noted that the netting may be rolled, cut and fed to the machine without being handled by the workmen. Furthermore, after the rolling operation, said netting is not disturbed to loosen the twists in the wire. For these reasons a greater percentage of perfect product is obtained. A still further advantageous feature resides in the particular arrangement of the means for controlling the supply of cooling liquid to the rollers. By having the controlling valves at the discharges any amount of water may be allowed to pass through the rollers as desired and yet said rollers will always be filled. The result is that the rollers may be kept in as warm or as cool a condition as desired. The detachable end caps and "trangs" or tracks are important features, for by substituting thicker or thinner tracks and caps of greater or less diameter, thicker or thinner sheets may be readily formed upon the same machine. Further than this, by changing the caps without changing the tracks, or vice versa, the wire netting may be embedded at various depths, all of which will be readily understood.

While the mechanism illustrated has been described in great detail, it will be readily understood upon an examination of the claims that many changes and modifications may be made without in any manner departing from the spirit or scope of the invention.

Having thus described my invention, what I claim as new and desire to secure by Letters Patent, is:—

1. In mechanism of the class described, the combination with a flat casting table, of means for forming a layer of glass on its upper face, and means, separate and distinct from said table and said means for forming a layer of glass thereon, for forming a separate layer of glass with wire mesh incorporated therein, and means for applying the same to the layer formed upon the table.

2. In mechanism of the class described, the combination of an underlying horizontal casting table of means for forming a layer of glass thereon, and means, separate and distinct from said table and said means for forming a layer of glass thereon, for forming a separate layer of glass above the table and means for applying the same to the layer located upon the table with wire incorporated therebetween.

3. In mechanism of the class described, the combination with means for supporting a batch of molten glass and forming a lower layer of glass therefrom, of means located above the first named means for supporting another batch of molten glass and forming another layer therefrom independent of the first named layer and of the first named means, said second layer having a sheet of wire fabric incorporated therein.

4. In mechanism of the class described, the combination with a horizontal casting table, of a roller coacting therewith for forming a layer of glass on the upper face of the table, and means separate from the table for forming a separate layer having a sheet of wire fabric incorporated therein, part of said last mentioned means coacting with the table to unite the layers.

5. In mechanism of the class described, the combination with a horizontal casting table, of a roller coacting therewith for forming a layer of glass, and means, separate from the table and roller, for forming a separate layer a portion of which means coöperates with the table to unite the two layers so separately formed.

6. In mechanism of the class described, the combination with a horizontal casting table, of means for forming a layer of glass thereon, and separate means for forming a separate layer, said latter means including a roller that also coacts with the table.

7. In mechanism of the class described, the combination with a casting table, of a roller coacting therewith for forming a layer of glass, and two other coacting rollers for forming another layer of glass one of which coacting rollers coacts with the table to unite the two layers thus separately formed.

8. In mechanism of the class described, the combination with a horizontal casting table, of a roller coacting therewith for forming a layer of glass, and other coacting rollers for forming another layer of glass, one of said coacting rollers also coacting with the table and uniting thereon the layers so formed.

9. In mechanism of the class described, the combination with a horizontal casting table, of means for forming a layer thereon, separate means for forming a distinct separate layer, said latter means including a roller coacting with the table for uniting the separate layers thereon.

10. In mechanism of the class described, the combination with a movable casting table, of a roller coacting therewith for forming a primary layer of glass, means located above and separate from the table for forming a secondary layer independent of the primary layer and uniting the layers upon the table.

11. In mechanism of the class described, the combination with a movable casting table, of a roller coacting therewith for forming a primary layer, other coacting rollers located above the table for forming a secondary layer, one of said last mentioned rollers coacting with the table for uniting the layers upon the same.

12. In mechanism of the class described, the combination with a reciprocatory horizontal casting table, of a roller journaled above the table and coacting with the same to form a primary layer, and coacting rollers disposed above the table and in rear of the primary roller to form a secondary layer, one of said coacting rollers also coacting with the table to unite the layers thereon.

13. In mechanism of the class described, the combination with a table, of a primary sheet-forming roller journaled above the table and coacting therewith, said roller being spaced from the table a distance equal to the thickness of the first layer to be formed, coacting rollers journaled above the table and spaced apart a distance equal to the thickness of the second layer to be formed, one of said coacting rollers being disposed in rear of the primary roller and coacting with the table, said roller being located a distance from the table equal to the thickness of the finished sheet.

14. In mechanism of the class described, the combination with a casting table, of a roller coacting therewith for forming a primary layer thereon, coacting rollers journaled above the table for forming a secondary layer, and gearing connecting the rollers.

15. In mechanism of the class described, the combination with a horizontal casting table, of means for forming a layer thereon, coacting rollers for forming another layer, and gearing connecting the coacting rollers and the table.

16. In mechanism of the class described, the combination with a reciprocatory casting table, of a primary roller coacting therewith to form a primary layer, coacting rollers located above the table for forming a secondary layer, a rack attached to the table, and intermeshing gear wheels carried by the coacting rollers, one of said gear wheels meshing with the rack.

17. In mechanism of the class described, the combination with a horizontal casting table, of means for forming a primary layer of glass thereon, coacting rollers for forming a secondary layer, said rollers having journals, and movable boxes carrying the journals.

18. In mechanism of the class described, the combination with a reciprocatory horizontal casting table, of a roller coacting therewith for forming a primary layer, coacting rollers disposed above the table and in rear of the primary roller for forming a secondary layer, one of said rollers being larger than the other and also coacting with the table for uniting the two layers and means for driving the various rollers upon the reciprocation of the table.

19. In mechanism of the class described, the combination with coacting rollers for forming a layer of glass, of means for introducing wire between the rollers and against the face of one of the same said wire being applied to one face of the layer formed thereby, and means for applying glass to the wired face of said layer.

20. In mechanism of the class described, the combination with coacting rollers for forming a layer of glass, of means for introducing wire between the rollers and against the face of one of the same, and mechanism for forming another layer and uniting said layers with the wire interposed.

21. In mechanism of the class described, the combination with a movable casting table, of means for forming a layer of glass thereon, coacting rollers located above the table for forming another layer, and means for introducing wire between the coacting rollers.

22. In mechanism of the class described, the combination with a movable casting table, of means for forming a layer of glass thereon, coacting rollers located above the table for forming another layer, and a chute extending to a point above the coacting rollers.

23. In mechanism of the class described, the combination with a reciprocatory casting table, of means for reciprocating the table, a roller journaled above and coacting with the table for forming a layer thereon, coacting rollers located above the table for forming a secondary layer, one of said rollers also coacting with said table for uniting the layers, and an inclined wire supporting chute leading to the coacting rollers.

24. In mechanism of the class described, the combination with a reciprocatory casting table, of means for reciprocating the table, a primary layer-forming roller journaled above the table and coacting therewith, spaced coacting rollers arranged above and in rear of the primary layer-forming roller for forming a secondary layer, one of said rollers coacting with the table to unite the layers thereon, an inclined chute extending to a point above the coacting rollers and having a scale along one edge of the same, a wire reel located in rear of the chute, pressing and feed rollers interposed between the chute and reel, and shears interposed between the feed rollers and chute.

In testimony whereof, I hereunto affix my signature in presence of two witnesses.

NICKLAS FRANZEN.

Witnesses:
FRANK MILLER,
N. C. WIEPPER.